US 6,584,727 B1

United States Patent
De Shazer et al.

(10) Patent No.: US 6,584,727 B1
(45) Date of Patent: Jul. 1, 2003

(54) LIVE BAIT CONTAINER FOR WADE FISHING AND TROLLING

(76) Inventors: Richard Frank De Shazer, 1023 N. Virginia St., Port Lavaca, TX (US) 77979; James Kirby Smith, 139 Heron Dr., Port Lavaca, TX (US) 77979

( * ) Notice: Subject to any disclaimer, the term of this patent is extended or adjusted under 35 U.S.C. 154(b) by 0 days.

(21) Appl. No.: 10/131,312

(22) Filed: Apr. 23, 2002

(51) Int. Cl.⁷ .............................................. A01K 97/05
(52) U.S. Cl. ......................................................... 43/55
(58) Field of Search .............................................. 43/55

(56) References Cited

U.S. PATENT DOCUMENTS

| | | | | |
|---|---|---|---|---|
| 1,490,868 A | * | 4/1924 | Voell ............................... | 43/55 |
| 2,656,640 A | * | 10/1953 | Johnson et al. ................. | 43/56 |
| 2,657,496 A | | 11/1953 | Spootswood | |
| 2,834,145 A | | 5/1958 | Kisiel | |
| 3,009,281 A | | 11/1961 | Unger | |
| 3,025,629 A | * | 3/1962 | Sears ............................ | 43/55 |
| 3,728,812 A | | 4/1973 | Woolworth et al. | |
| 4,019,274 A | | 4/1977 | Landell et al. | |
| 4,554,757 A | | 11/1985 | Sakuta, Jr. | |
| 4,686,788 A | | 8/1987 | Hartman | |
| 4,890,413 A | * | 1/1990 | Nelson et al. .................. | 43/55 |
| 5,123,198 A | | 6/1992 | Von Grossmann | |
| 5,191,732 A | * | 3/1993 | Berdinsky et al. ............. | 43/55 |
| 5,394,639 A | | 3/1995 | Tentler | |
| 5,529,204 A | | 6/1996 | Sykes | |
| 5,802,760 A | * | 9/1998 | Campbell ....................... | 43/57 |

* cited by examiner

*Primary Examiner*—Charles T. Jordan
*Assistant Examiner*—Bret Hayes

(57) ABSTRACT

A live bait container for wade fishing and trolling comprises a hollow cylindrical shell with an integral bottom and a modified frustrum of a right cylinder forming the top. An access opening and cover assembly is disposed on the front face of the container. The container shall have a main and a top buoyancy chamber disposed to maintain the bait chamber submerged while keeping the access opening above water. The container's midsection, including the sloping back shall be plastic mesh. Other material used in the construction, except the access cover assembly, is generally of transparent plastic enabling the bait to be observed. The removable access cover assembly comprises a plurality of elastic strips with a retaining device on both ends that engage the container. Bait is recovered by reaching between the elastic strips. The container has a keel containing a handhold for carrying and a hole for a two line.

14 Claims, 4 Drawing Sheets

LIVE BAIT CONTAINER FOR WADE FISHING AND TROLLING

BACKGROUND

1. Field of Invention

This invention generally relates to a container for the confinement of live bait while the fishing, trolling, fishing from a stationary boat, or drift fishing from a boat.

2. Description of Prior Art

Containers for confining live bait for storage and for fishing have been around since man started fishing. With the advent of motors on boats a form of fishing called trolling was developed. Trolling consists of dragging a hook, line and bait behind a moving boat. It was necessary to have a means of keeping bait alive and accessible to the angler while trolling. There are several desirable conditions that must be met to achieve this goal. First, the container must allow enough fresh water circulation to keep the bait from dying from insufficient oxygen not only while trolling but also when the boat is stopped, while drift fishing and while wade fishing. Second, the container must have sufficient buoyancy to float while being towed to prevent being damaged or lost due to contact with the bottom or underwater obstacles. Third, it must be easy to put the bait into the container without losing it in the boat or into the water. Fourth, the angler needs to be able to see the bait to determine the amount and its condition without opening the container door. Fifth, the floating container must be designed to be towed through the water smoothly using a minimum of energy. This is not a problem when a boat is towing the container but it is a big problem when an angle is wade fishing. The more energy required to tow the container the more fatigued the angler. Sixth, it must be easy retrieve the bait from the container without the bait escaping.

Live shrimp and live mullet are adept at jumping out of a container through an open access top door while the angler is attempting to grasp a fresh bait. A trap door arrangement is used on most present containers. Retrieving the bait from the container is particularly difficult for a wader angler who must try to hold their rod and reel out of the water, control their other equipment, and avoid getting entangled in their fish stringer while pulling the floating container to them and then trying to get a fish bait without submerging the container while pushing open the trap door and holding it open without allowing the bait to escape.

There are a number of containers that are related to this application, most are designed, primarily, to be towed behind a boat while trolling. Specifically, live bait containers designed primarily for wade fishing, drift fishing, and still fishing, but also designed for trolling have been ignored. All of the present designs have disadvantages and all fail to meet all of the above criteria.

U.S. Pat. No. 2,657,496 to Spotswood (1949) discloses a box container with a rounded front designed to be towed behind a boat. There are several advantages to this design. The container will sink when the boat is stopped as it has no floatation device. The container has a trap door that will allow the live bait to escape when opened and does not have enough openings, for water circulation to sustain the life of the live bait for any prolonged length of time. It is not constructed from a transparent material and retrieving bait would be very difficult.

U.S. Pat. No. 2,834,145 to Kisiel (1956) discloses a cylindrical container with conical ends. One end has three fins to support the container when it is out of the water. A small keel is mounted on the side opposite the screened door. There is a small screened area on the sides and screened door above the waterline on the top. The amount and placement of the screen limits the ability of the container to circulate fresh water as the water tends to flow by the screen rather than through the screen. The door is placed so that the bait can readily escape while the angler is attempting to retrieve fresh bait from the container. The container appears to be made of non transparent material which makes it impossible to see the bait when the container is in the water.

U.S. Pat. No. 3,009,281 to Unger (1958) discloses a cylindrical container having one conical end and one flat end. A longitudinal floatation chamber is positioned on each side of the body of the container. There are several disadvantages to this design that are well known to the angler as this is the model for most trolling type bait containers presently available to the public.

There are not enough openings to permit sufficient flow of fresh water into the container to keep the bait alive, hence there is a high rate of death to live bait using this design.

The inward opening trap door makes it very difficult to put live bait in the container or to retrieve fresh bait. The spring on the door requires the angler to hold it open with one hand this restricts the available opening when filling the container causing spills of bait into the boat or into the water. The door must be pushed open far enough to grasp the fresh bait allowing bait to jump out and escape. This problem is especially true of live shrimp and mullet. Wade anglers have an especially hard time as the container is floating and while trying to keep the door open to get to the bait, the container is generally pushed under water thus allowing the bait to swim out and escape.

Another problem with the Unger design is that by having the buoyant chambers on each side at the center of the container, the container rides too high in the water, limiting the available water available for the bait. This condition causes a lack of oxygen for the bait and they die prematurely.

The body of the container is not transparent. To determine the amount of bait in the container, one must lift the container out of the water, empty out the trapped water then hold open the trap door and peer through the door opening to determine the amount and condition of the bait.

The door has a bad habit of sticking partially open letting bait escape. There is no keel or other means of stabilizing the container causing it to run from side to side while being towed at trolling speed.

Our invention meets all of the above criteria for keeping bait alive and accessible and is far superior to the Unger patent.

U.S. Pat. No. 3,728,812 to Woolworth et al. (1973) discloses a trolling bucket that has all the disadvantages of the Unger design plus it has even fewer access holes for water circulation.

U.S. Pat. No. 4,019,274 to Landell et al. (1977) disclosed a trolling bucket with a loading latch means. This bucket has all the disadvantages of the Woolworth patent with the added problem that it latches open automatically and if the angler forgets to unlatch the door, the bait escapes. This has happened.

U.S. Pat. No. 4,554,757 to Sakuta (1985) discloses a trolling bucket with an upward opening door that would allow the bait to escape while the angler attempts to catch fresh bait. There are too few openings in the bucket to allow necessary water circulation. The bucket material is not transparent thus making it impossible to see the condition of the bait. There is no keel or other stabilizing feature to keep the bucket from whipping from side to side while being towed by a boat.

U.S. Pat. No. 4,686,788 to Hartman (1987) discloses a minnow bucket that has all of the disadvantages of the Unger patent but also has the fatal feature of lifting the live bait up closer to the door. This feature may work for minnows or some other baits but it would allow all of the baits, shrimp, mullet, and croakers (commonly used for salt water fishing) to escape.

U.S. Pat. No. 5,123,198 to Von Grossmann (1992) discloses a bait bucket having all of the disadvantages of the Unger patent and the further disadvantage of hinging the whole top section to gain access to the bait in the main container but also lifts the bait upward to the open top allowing the bait to escape.

U.S. Pat. No. 5,394,639 to Tentler (1995) discloses a rectangular trollable bait bucket and a bait keeper. The bait bucket has no floatation device and therefore it will not be readily accessible and fails to fill any of the required criteria.

U.S. Pat. No. 5,529,204 to Sykes (1996) discloses a floating minnow bucket with flat ends. This bucket is not suitable for trolling.

OBJECTS AND ADVANTAGES

Accordingly, the objects and advantages of the live bait container for wade fishing and trolling of the present invention are to provide:

(a) an improved system to increase water circulation in the container when the container is not moving or is moving very slowly through the water during wade fishing or drift fishing;

(b) an improved buoyancy system that provides complete submergence of the bait compartment to give the bait the maximum available room to swim and more oxygen while keeping the access opening above water.

(c) a cover assembly for the access opening in the container that:
  (1) allows the angler to reach through a series of elastic strips, to retrieve fresh bait, while maintaining a tight fit around the angler's wrist and hand (preventing the bait from escaping);
  (2) allows the cover portion of the assembly to be unhooked from one side of the opening, giving full access to the complete opening to facilitate putting bait into the container;
  (3) allows for quick and easy removal of the cover for cleaning or replacement;

(d) a container in which the bait can be observed while the container is floating in the water.

Further objects and advantages are to provide a bait container that can be towed behind a boat without whipping from side to side in the water, is easy to use by a wade angler, is tough enough to withstand the beating it takes while being used or transported, is constructed from a transparent material so that the amount and condition of the bait may be observed, is easy to clean and store, is inexpensive to manufacture, and is affordable to all fishing persons. Further objects and advantages will become apparent in the following discourse.

DRAWING FIGURES

All but one of the figures in the drawings are shown with the container sitting on its flat end which will be refereed to as the bottom. This is done for clarity in the drawings. While the container is in the water it will float horizontally on its back but it will sit vertically on its bottom while serving as a live well in the boat or on the bank.

FIG. 1 shows an isomeric view of the top, front, and right side of the container. The container is transparent. The interior bulkhead and the opposite wall of the container are shown in phantom.

FIG. 2 shows an isometric of the top, back, and left side of the container. The container is transparent. The interior bulkhead and opposite wall are shown in phantom.

FIG. 3 shows a plan view of the top of the container.

FIG. 4 shows a vertical section through the container at the approximate centerline.

FIG. 5 shows the container in the water being towed by a boat or a wading angler. The tow line is shown attached to the container.

FIG. 6 shows an enlarged section through the access opening.

FIG. 7 shows an enlarged front view of the flattened access cover removed from the container.

REFERENCE NUMERALS IN DRAWINGS

| | |
|---|---|
| 10 | cylindrical body assembly |
| 11 | cylindrical wall |
| 12 | main buoyancy chamber assembly |
| 13 | main buoyancy chamber top |
| 14 | bulkhead |
| 15L | left side plastic mesh |
| 15R | right side plastic mesh |
| 16 | sloping plastic mesh back |
| 18 | container bottom |
| 19L | left body stiffener |
| 19LH | left body stiffener retainer hole |
| 19R | right body stiffener |
| 19RH | right body stiffener retainer hole |
| 20 | keel |
| 21 | towline |
| 22 | cutout for hand hold |
| 23 | hole for a tow line |
| 30 | top buoyancy chamber assembly |
| 31 | top buoyancy chamber side |
| 32 | top buoyancy chamber sloping back |
| 33 | top buoyancy chamber top |
| 34 | top buoyancy chamber bottom |
| 40 | access cover assembly |
| 41 | access cover |
| 41E | access cover extended |
| 42R | right cover hook |
| 42RE | extended position of cover hook |
| 42L | left cover hook |
| 42H | hook retainer hole |
| 43R | right hook bracket |
| 43L | left hook bracket |
| 43LH | left hook bracket retainer hole |
| 43RH | right hook bracket retainer hole |
| 44 | elastic strips |
| 45 | retainer pin |
| 46R | right cover bar |
| 46RE | extended position of right cover bar |
| 46L | left cover bar |
| 47 | fastener |
| 50 | access opening |

SUMMARY

With the above background in mind, it is therefore a primary object of the present invention to provide a live bait container for wade fishing or trolling of the general character described, which overcomes the above-mentioned drawbacks of prior known trolling buckets. Specifically, it is an object of the present invention to provide a live bait container which is sturdy, easy to use and economical to manufacture, and which performs in water when wade fishing or trolling in a more satisfactory manner than has been previously possible with known trolling buckets.

Still more specifically, it is a object of the present invention to provide a live bait container including an improved flotation system that is constructed of clear plastic so that the bait can be observed and the floatation device and will keep the access opening above water while maintaining complete submergence of that part of the cylindrical body assembly that contains the bait.

It is a further object of the flotation system to provide a large enough flotation chamber, in the top of the container, to increase the ability of the container to continue to flat with the access opening out of the water, during the retrieval of bait, especially while wade fishing.

It is yet a further object of the present invention to provide a more efficient system to increase water circulation in the container (to prevent the live bait from dying) especially when the container is moving slowly through the water while wade fishing or drift fishing from a boat. Constructing the center section out of plastic mesh vastly increases the open area available for increased circulation of fresh water, over other known trolling buckets.

It is yet a further object of the present invention to increase the flow of water into the container by sloping the back of the upper section of the container like the bow of a flat boat, thus forcing water through the openings in the mesh when being towed. The sloped bow of this invention combined with attaching the tow line through the keel just below the water line raises the bow of the floating container slightly decreasing the energy required to tow the container through the water. This is especially important for wade fishing (to reduce the fatigue of the angler).

A further object of the present invention is to provide an improved method for loading the bait into the container and for retrieving fresh bait from the container. An access opening is disposed between the main buoyancy chamber top and the top buoyancy chamber bottom and between the right body stiffener and the left body stiffener. This access opening is covered by an access cover assembly consisting of a plurality of elastic material strips whose sides are contiguous to each other and whose ends are aligned and are retained between a cover hook and a cover bar, disposed at each end of the strips, and held together by fasteners to clamp the elastic material firmly to prevent slipping.

A hook bracket is attached to each side of the access opening to engage the cover hooks. When the cover is attached to the container, exerting a lateral force on the cover bar will stretch the elastic strips allowing the cover hook to be disengaged from the hook bracket. The flexible, elastic cover can then be folded back over the other end of the cover assembly providing a clear opening for loading live bait into the container. The cover is reinstalled by exerting a lateral force on the unhooked cover bar to stretch the elastic strips and hooking the cover hook over the hook bracket. A retainer pin is installed in one of the cover hooks to prevent loss of the access cover when the opposite side is unhooked. To remove the cover from the container, unhook the side opposite the retainer pin, remove the retainer pin and the entire cover comes off for cleaning or for replacing if the cover material losses its elasticity. Reaching through the joints in the elastic strips enables the angler to grasp a fresh bait and extract it while the strips maintain a tight fit around the wrist and hand, preventing the escape of live bait.

It is yet a further object of the present invention to provide a device to keep the container towing in a straight path to avoid whipping the container back and forth killing the bait or damaging the bait container. A large keel assembly is attached normal to the back of the container starting at the top buoyancy chamber top, down the inclined plastic mesh back, and thence down the back of the transparent cylindrical wall and terminating at the container bottom. The keel encourages the container to move in a straight path and contains a cutout for a hand hold above the sloping back (to carry the container), and a hole for a two line positioned between the hand hold and the top buoyancy chamber top.

It is yet a further object of the present invention to provide a container that is fully transparent except for the access opening cover. Clear plastic is the preferred material but is not intended to limit the use of newer materials as they become available. The use of a clear material provides the visual inspection of the bait while the container is floating in the water or sitting in the boat with water and bait in the container. Clear plastic is not as viable to the fish as the colored plastic now being used in trolling buckets. This feature is not important while trolling or fishing from a boat but it is highly valuable while wade fishing to help prevent spooking the fish.

BRIEF DESCRIPTION OF THE DRAWINGS

The term "bait container" or "container" is used to denote the entire device of our invention. The term "assembly" is used to denote several element joined into a single unit. The bait container comprises four basic assemblies; a cylindrical body assembly, a main buoyancy chamber assembly, a top buoyancy chamber assembly, and an access cover assembly.

Figure 1:
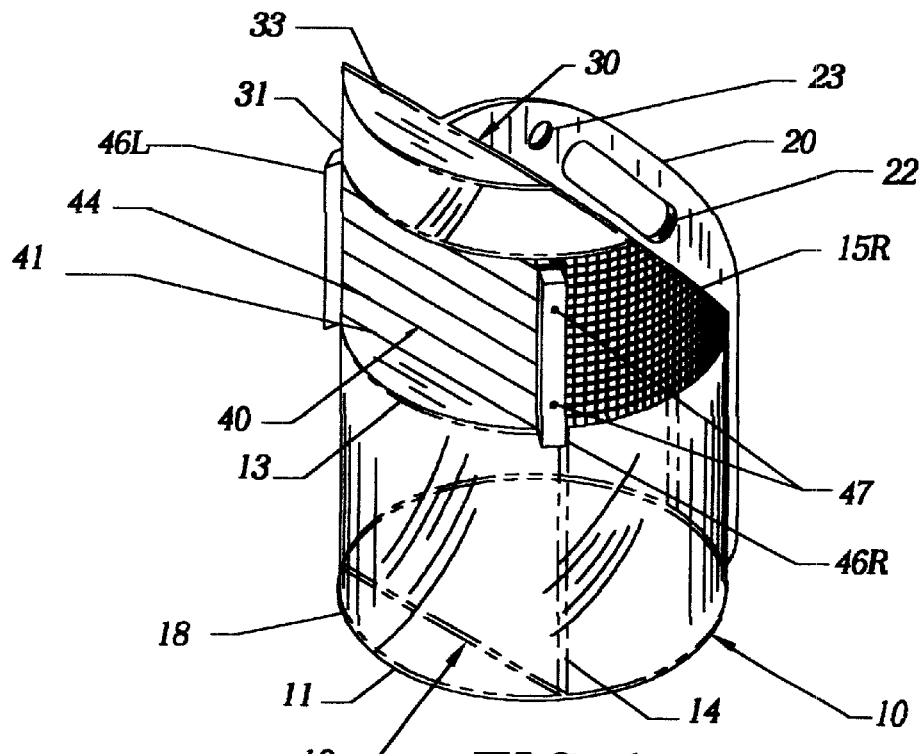
FIG. 1—Front Isometric View

A preferred embodiment of the bait container is shown in a front isometric view in FIG. 1, in its upright position.

Figure 2:
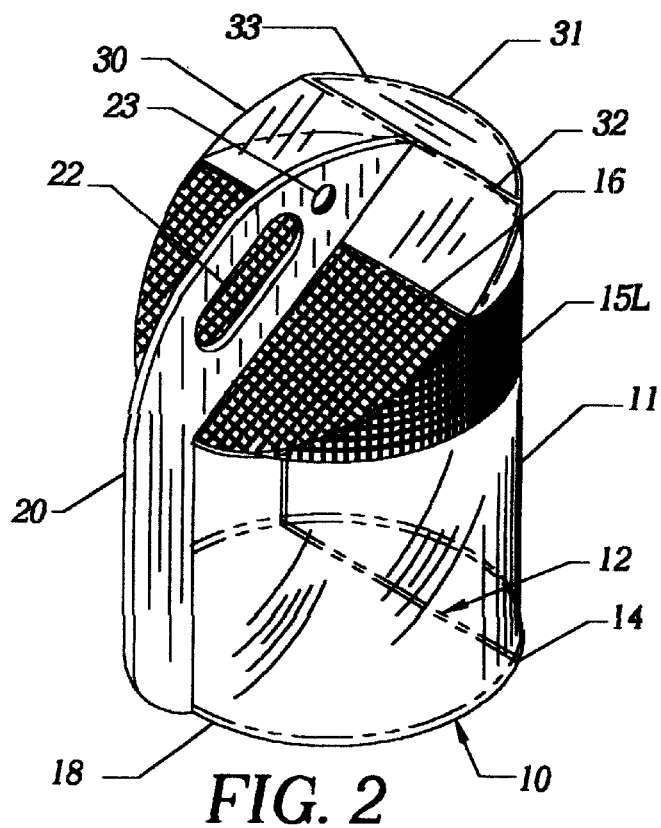

FIG. 2—Back Isometric View

A preferred embodiment of the bait container is shown in a back isometric view in FIG. 2, in its upright position.

FIG. 3—Plan View

Figure 3:
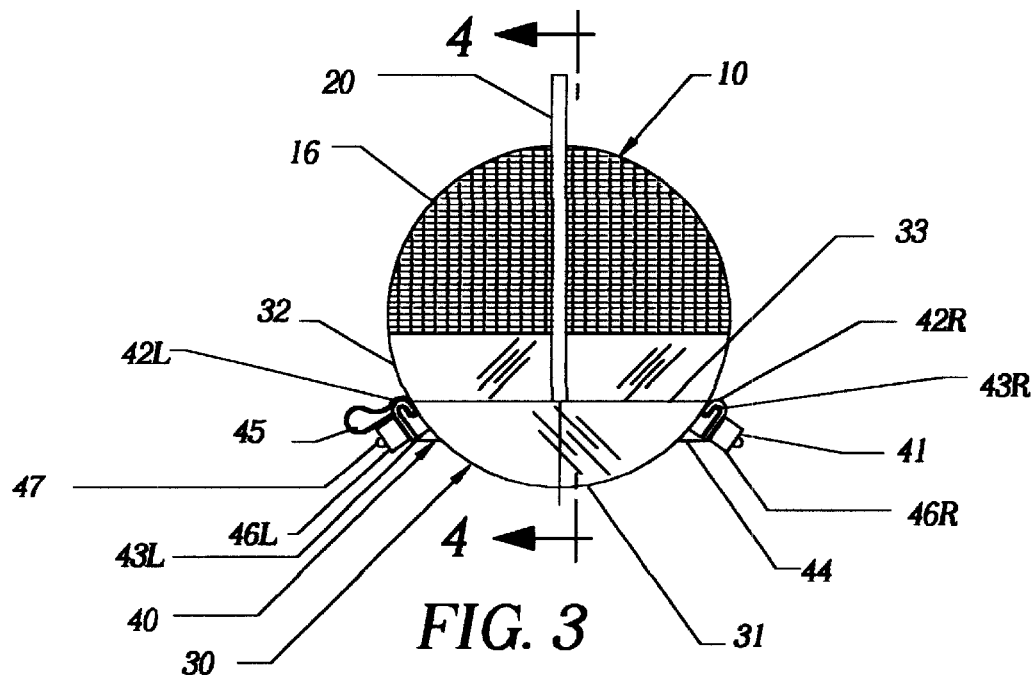

The plan view of FIG. 3 shows the top buoyancy chamber assembly, attached to the sloping plastic mesh back of the cylindrical body.

FIG. 4—Section

Figure 4:
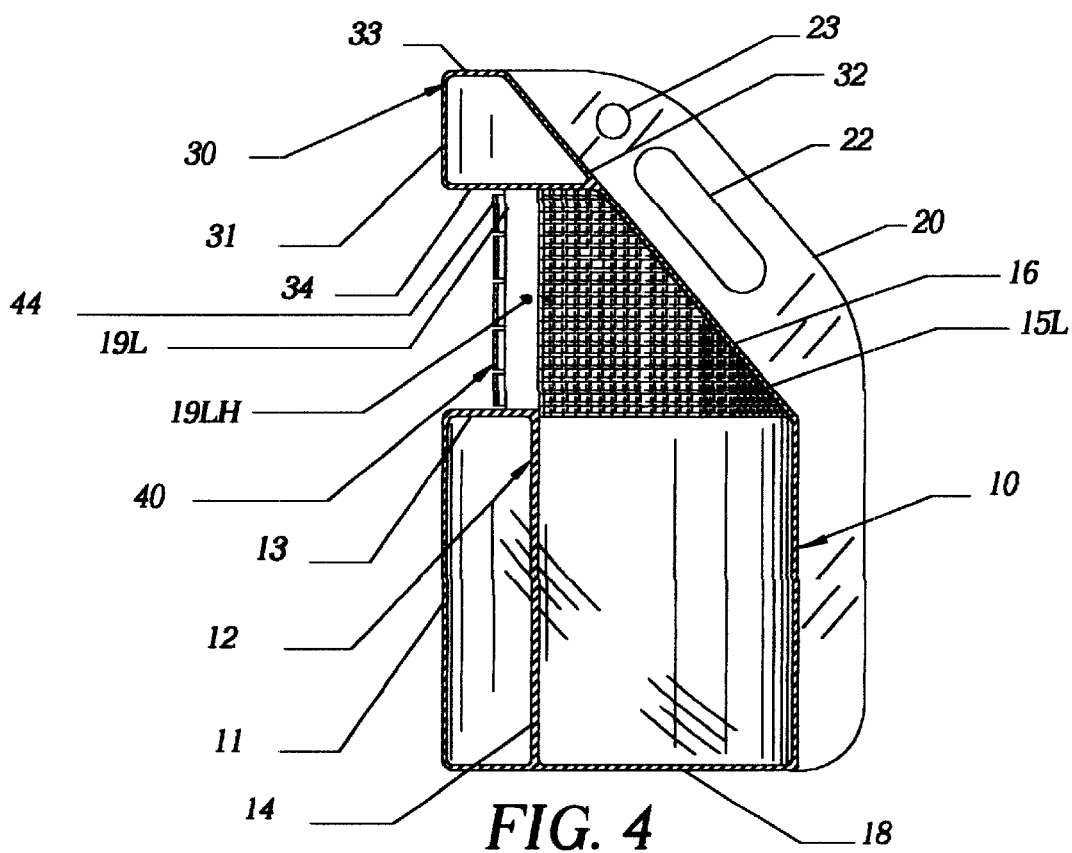

A section of the bait container in FIG. 4 is cut vertically from the top of the container through its bottom, on the centerline, facing the keel.

FIG. 5—Side View

Figure 5:
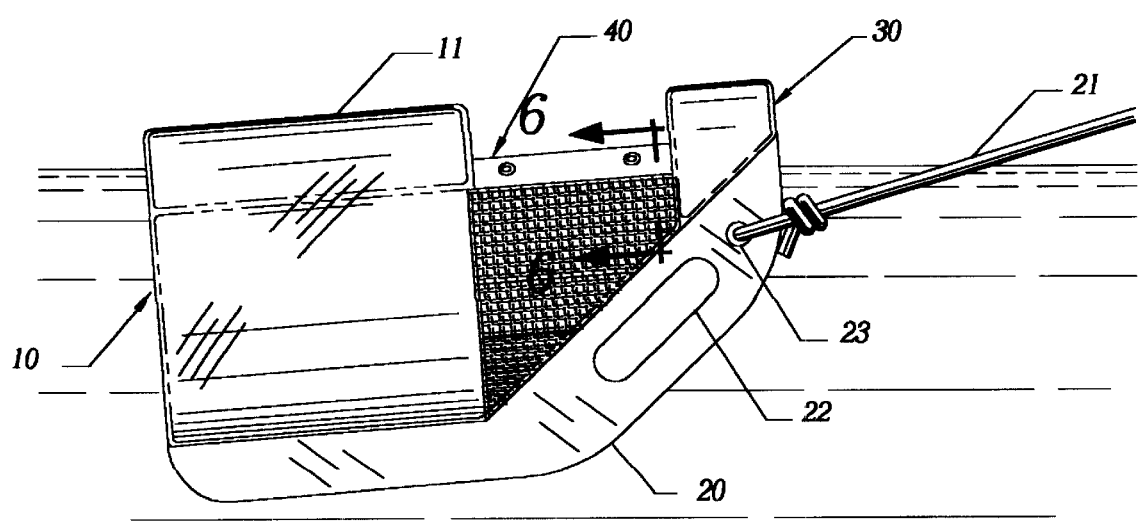

A side view of the bait container in FIG. 5 shows the bait container floating in the water and being towed by a tow line.

Figure 6:
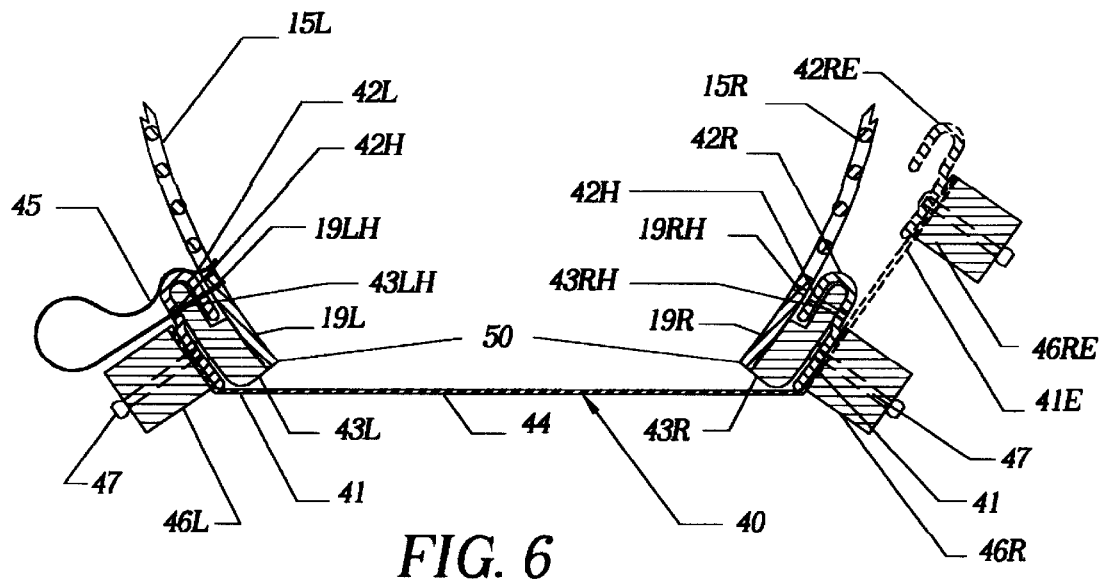

FIGS. 6—Partial Section

A partial section in FIG. 6 shows a section through the access cover assembly. This is an enlarged view to enable showing of the details of the assembly.

FIG. 7—Front View

Figure 7:
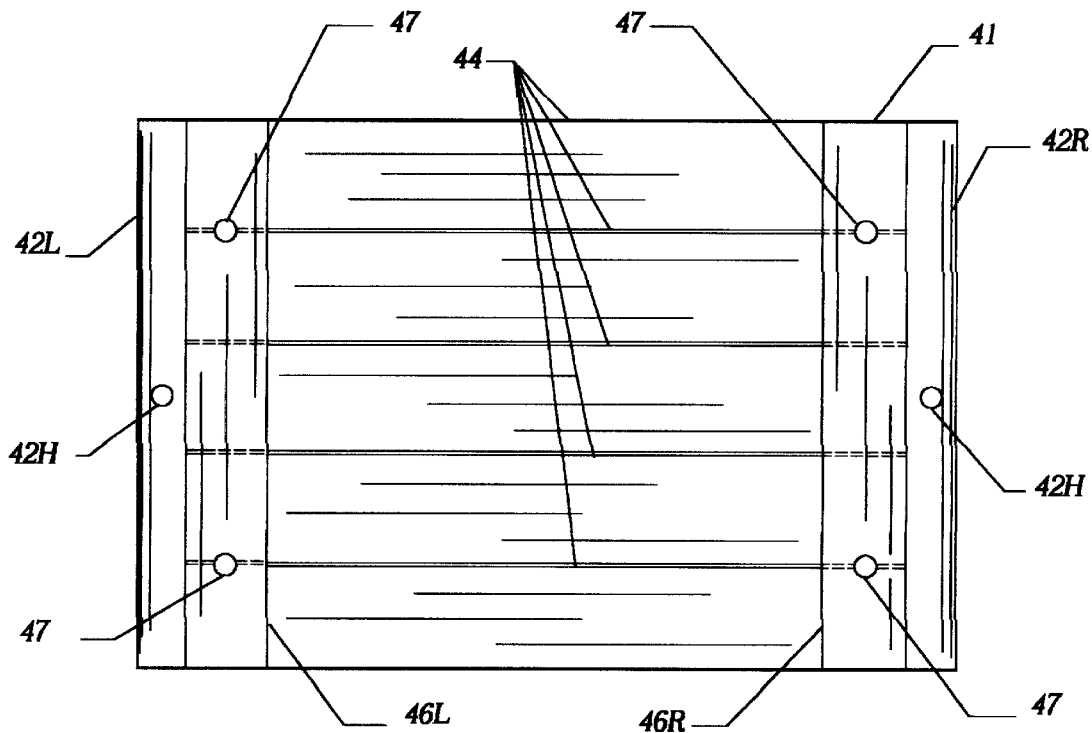

An enlarged front view of the flattened access cover is shown in FIG. 7.

DETAILED DESCRIPTION OF THE PREFERRED EMBODIMENT

The live bait container for wade fishing and trolling of this invention has two normal positions. The first is a generally vertical position as when the bait container is being carried or is resting on some solid surface. The other is a generally horizontal configuration, as when the bait container is floating or being towed. In describing the illustrated structure, such expressions as "top", "side", shall for convenience refer to the positions when the bait container is in a generally vertical configuration. The expressions "left", and "right", shall for convenience refer to the left hand and right hand of a person facing the vertical bait container's access opening. The bait container's access opening face shall for convenience be referred to as the "front" and the opposite side, where the keel is located, shall be referred to as the "back".

The bait container, with the exception of the access cover assembly, can generally be manufactured in two halves of clear plastic and joined together to form a complete container. The different elements of the container would all be one continuous piece, however for clarification in describing the design of the present invention each element has been given a reference number and the juncture of two or more elements will be referred to as "joins".

Referring now to the drawings, the live bait container according to the present invention comprises a generally cylindrical body assembly 10 having a flat transparent container bottom 18 with a transparent cylindrical wall 11 as shown in FIGS. 1, 2, 4 and 5. Right side plastic mesh 15R shown in FIG. 1 joins to the top edge of cylindrical wall 11, at the back center and of cylindrical body assembly 10 and continues around the top edge of cylindrical wall 11 where it joins the right edge of right body stiffener 19R. Plastic mesh side 15R continues vertically until it intersects and joins sloping plastic mesh back 16, shown in FIG. 2 and FIG. 3, and joins top buoyancy chamber bottom 34, shown in FIG. 4. Left side plastic mesh 15L, shown in FIG. 2 and FIG. 4, joins the top edge of cylindrical wall 11, at the back center of cylindrical body assembly 10 and continues around the top edge of cylindrical wall 11 where it joins the left edge of left body stiffener 19L. Plastic mesh 15L continues vertically until it intersects and joins to sloping plastic mesh back 16, shown in FIG. 2, and top buoyancy chamber bottom 34. Sloping plastic mesh back 16 intersect and joins the top edge of cylindrical wall 11 at the center of the back and then continues on an angle up and toward the front of the container until it intersects and joins the back juncture of top buoyancy chamber bottom 34 and top buoyancy chamber sloping back 32, shown in FIG. 3, forming a modified frustrum of a right cylinder, shown in FIG. 2, FIG. 4, and FIG. 5.

Main buoyancy chamber assembly 12 is formed generally by an arc of the front quarter of cylindrical wall 11. A clear plastic bulkhead 14 joins container bottom 18 and cylindrical wall 11 forming a chord between the arc of cylindrical wall 11 and continues vertically to the same height as the top of cylindrical wall 11 where it joins the clear plastic main buoyancy chamber top 13, shown in FIG. 4. Main buoyancy chamber top 13 is a segment of a circle whose are edge is flush with and joins the top edge of the outside of cylindrical wall 11 and whose chord is flush with and joins the inside face of bulkhead 14. The top surface of main buoyancy chamber top 13 forms the bottom of access opening 50. The enclosure formed by container bottom 18, cylindrical wall 11, and bulkhead 4 contain water and bait when the container is sitting upright in the boat or on the bank.

Left body stiffener 19L, shown in FIG. 4 and FIG. 6, joins the top surface of main buoyancy chamber top 13 at the left end along the left periphery of main buoyancy chamber top 13 and extends vertically to intersect and joins the left periphery of top buoyancy chamber bottom 34 forming the left side of access opening 50, shown in FIG .6. Left body stiffener 19L joins the left side plastic mesh 15L along its vertical length, shown in FIG. 4. Left side body stiffener retainer hole 19LH is disposed at the midpoint of left body stiffener 19L and aligns with other retainer holes 42H and 43LH, shown in FIG. 6.

Right body stiffener 19R, shown in FIG. 6, joins the top surface of main buoyancy chamber top 13 at the right end along its right periphery and extends vertically to intersect and joins the right periphery of top buoyancy chamber bottom 34 forming the right side of access opening 50. Right body stiffener 19R joins right side plastic mesh 15R along its vertical length shown in FIG. 1, FIG. 5, FIG. 6. Right body stiffener retainer hole 19RH is the mirror image of left body stiffener retainer holed 19LH.

The combination of right side plastic mesh 15R, left side plastic mesh 15L, and sloping plastic mesh back 16 provide a multitude of openings to circulate enough fresh water to keep the bait alive. The flat configuration of sloping plastic mesh back 16, when towed even at walking speed, force more fresh water into the container.

Top buoyancy chamber assembly 30 comprises several elements, of clear plastic, joined together to form an airtight chamber, shown in FIG. 1 and FIG. 2 and are best shown in FIG. 3 and FIG. 4. Top buoyancy chamber side 31 is a segment of a cylinder with the same radius as cylindrical wall 11 and a chord length generally less than the diameter of cylindrical body assembly 10. Both ends of top buoyancy chamber side 31 angle up and to the front at the same angle of sloping plastic mesh back 16, shown in FIG. 4. Top buoyancy chamber bottom 34, shown in FIG. 4, is the segment of a circle whose radius and chord length are the same as the bottom edge of top buoyancy chamber side 31. The bottom edge of top buoyancy chamber side 31 joins the upper surface of the top buoyancy chamber bottom 34 and forms the top of access opening 50, shown in FIG. 4. Top buoyancy chamber top 33 is a segment of a circle whose radius, arc length, and chord length are the same as the top edge of top buoyancy chamber side 31, shown in FIG. 3. The top edge of top buoyancy chamber side 31 joins the bottom surface of top buoyancy chamber top 33, shown in FIG. 4. Top buoyancy chamber sloping back 32, shown in FIG. 2, FIG. 3, and FIG. 4 has the same angle of slope and joins sloping plastic mesh back 16, shown in FIG. 4 and FIG. 5, and joins the edge of the chord of top buoyancy chamber top 33 and the edge of the chord of top buoyancy chamber bottom 34, shown in FIG. 2, FIG. 3, and FIG. 4.

The combination of main buoyancy chamber assembly 12 and top buoyancy chamber assembly 30 will maintain the container with access opening 50 on top while floating in the water. The section of the container confining the bait will be submerged thus allowing the maximum space for the bait while access opening 50 will float above the water. Top buoyancy chamber assembly 30 will substantially keep access opening 50 above the surface of the water while retrieving bait from the container.

The enlarged partial section shown in FIG. 6 details access cover assembly 40. Right hook bracket 43R joins right body stiffener 19R. Left hook bracket 43L joins left body stiffener 19L. Right cover hook 42R is disposed on the back face, at the right end, of elastic strips 44 and right cover bar 46R is disposed on the front face, at the right end, of elastic strips 44, and are clamped together using fasteners 47 to hold elastic strips 44 firmly, as shown in FIG. 6 and FIG. 7. Right body stiffener retainer hole 19RH, right hook bracket retainer hole 43RH, and retainer hole 42H are provided for left handed use.

Left cover hook 42L is disposed on the back face, at the left end, of elastic strips 44 and left cover bar 46L is disposed on the front face, at the left end, of elastic strips 44, and are clamped together using fasteners 47 to hold elastic strips 44 firmly as shown in FIG. 6 and FIG. 7. Retainer pin 45 is inserted through hook retainer hole 42H, left hook backet retainer hole 43LH, and through left body stiffener retainer hole 19LH shown in FIG. 6.

FIG. 6 shows elastic strips 44, right cover hook 42R, right cover bar 46K, and fasteners 47 in their normal positions. The broken lines show these same elements with elastic strips 41E stretched and right cover hook 42RE, right cover bar 46RE are extended and unhooked and are ready to be folded back over the left side of accessing opening 50. The entire access opening is now available for loading bait into the container without any obstructions. The use of a plurality of elastic strips 44 instead of the common trap door allows the angler to reach through the joints in plastic strips 44 which will stretch enough to allow retrieval of the bait from the container while maintaining a tight fit around the hand and wrist to prevent the live bait from escaping.

A keel 20 joins the back of cylindrical wall 11 at the vertical centerline of cylindrical body assembly 10 and extends up and towards the front, where it joins sloping plastic mesh back 16 and also joins top buoyancy chamber sloping back 32, terminating at the back edge of top buoyancy chamber top 33. Keel 20 has a cutout for a hand hold 22 in the sloping portion at the approximate center of the container for carrying the container. Keel 20 has a hole 23 for a tow line 21 disposed to improve towing characteristics.

Although the description of the preferred embodiment has been quite specific, it is contemplated that various modifications could be made without deviating from the spirit of the present invention. Thus the scope of the invention should be determined by the appended claims and their legal equivalents, rather than by the example given.

We claim:

1. A live bait container for wade fishing and trolling, generally constructed of molded transparent plastic comprising a cylindrical body assembly, having a cylindrical wall with a lower end molded to a container bottom and said cylindrical wall having an upper end, a section of said upper end is molded to a lower end of a left side plastic mesh, all plastic mesh are molded containing a multitude of openings, and to a lower end of a right side plastic mesh, and a portion of an upper end of said left side plastic mesh and portion of a upper end of said right side plastic mesh are molded to an sloping plastic mesh back, and the remainder of said left side plastic mesh and said right side plastic mesh are molded to a top buoyancy chamber assembly, an upper end of said sloping mesh back is molded to a top buoyancy chamber sloping back, a keel, having a cutout for a hand hold and a hole for a two line, is attached on an exterior surface perpendicular to said cylindrical wall starting at said container bottom and continuing vertically to said sloping plastic mesh back where said keel angles up said sloping plastic mesh back and continues up said top buoyancy chamber sloping back and terminates at a top buoyancy chamber top, and inside said cylindrical wall opposite said keel, a main buoyancy chamber assembly is molded in a quadrant of said cylindrical wall, the location of said main buoyancy chamber assembly is designated as a front of said container, the opposite side of said container where said keel is attached is designated a rear of said container, and said container having an access opening, and an access cover assembly disposed on said front of said container between said main buoyancy chamber assembly and said top buoyancy chamber assembly.

2. The container of claim 1, wherein said main buoyancy chamber comprises a bulkhead of flat transparent plastic having a upper end, an right edge, a left edge, and a bottom end molded with and disposed contiguous to said container bottom forming a chord within the front arc of said cylindrical wall, said right edge and said left edge of said bulkhead are molded vertically to said cylindrical wall extending from said container bottom to the same height as said upper end of said cylindrical wall where said bulkhead terminates and is molded to a main buoyancy chamber top of transparent plastic, said main buoyancy chamber top is molded to said front of said upper end of said cylindrical wall thus forming a watertight buoyancy chamber in said front of said container, assuring said container floating with said access opening up, and is transparent providing a means for viewing bait when said container is floating horizontally or is sitting vertically.

3. The container of claim 1, wherein said top buoyancy chamber assembly comprises generally a top buoyancy chamber side, in the form of an arc of a cylinder of molded plastic, molded to a top buoyancy chamber bottom of plastic formed in the shape of a segment of a circle having the same radius as said cylindrical wall, and molded to a top buoyancy chamber top of plastic formed in the shape of a segment of a circle smaller than said top buoyancy chamber bottom with the same radius as said cylindrical wall, and said top buoyancy chamber sloping back, sloping from said top buoyancy chamber bottom upward to said top buoyancy chamber top which is molded to said top buoyancy chamber bottom, to said top buoyancy chamber top and to said top buoyancy chamber side, forming said top buoyancy chamber assembly that is watertight and transparent thereby maintaining said access opening above water preventing said container from submerging while being towed, said top buoyancy chamber assembly is molded to said upper ends of said left side plastic mesh, said right side plastic mesh, and to said sloping plastic mesh back, with said top buoyancy chamber bottom forming the top of said access opening.

4. The container of claim 3, wherein said access opening comprises an opening in said front of said container disposed below said top buoyancy chamber bottom, and above said main buoyancy chamber top that forms the bottom of said access opening, a left body stiffener and a right body stiffener of solid plastic molded to an end of said right side plastic mesh and to an end of said left side plastic mesh disposed vertically between said main buoyancy chamber top and said top buoyancy chamber bottom forming two sides of said access opening which is covered by said access cover assembly.

5. The container of claim 4, wherein said access cover assembly comprises an access cover having a plurality of elastic strips whose sides are contiguous one to the other presenting a continuous surface, and said elastic strips have a right end molded between a right cover hook and a right cover bar, and having a left end of said elastic strips molded between a left cover hook and a left cover bar, a fastener may be used to connect the cover hooks to the cover bars, said right cover hook engages a right hook bracket attached to said right body stiffener, and when said elastic strips are stretched to allow said left cover hook to engage a left hook bracket attached to said left body stiffener, said access cover effectively closes said access opening allowing retrieval of bait by reaching between said elastic strips, which will stretch enough to provide a means for entry of a hand a wrist of an angler, into said container but said elastic strips will remain tight enough to prevent bait from escaping.

6. The container of claim 5, wherein said access cover assembly comprises a means of securing one end of said access cover assembly to said container with a retainer pin inserted in a left hook bracket retainer hole or into a right hook bracket retainer hole to provide a means for preventing loss of said access cover when both ends of said access covers are unhooked, when said retainer pin is removed and both ends of said access cover are unhooked said access cover can be removed from said container providing a means for cleaning or replacement but if only one side is unhooked said access cover can be folded back to provide a means for placing bait in said container without obstructions.

7. The container of claim 1, wherein said keel comprises a relative large flat plastic member having said cutout for a hand hold disposed in said keel, providing a means for carrying said container and said keel having said hole for said two line disposed to raise said top buoyancy chamber assembly providing a means for reducing drag while improving towing characteristics of said container while being towed, said keel is relatively large to provide a means for keeping said container running straight without rotating when being towed.

8. A live container for wade fishing and trolling, comprising generally a cylindrical body assembly constructed of molded transparent plastic, having a cylindrical wall with a lower end molded to a container bottom of transparent plastic and said cylindrical wall having an upper end, a section of said upper end is molded to a lower end of a left side plastic mesh, all plastic mesh are molded containing a multitude of openings, and to a lower end of a right side plastic mesh, and a portion of an upper end of said left side plastic mesh and a portion of an upper end of said right side plastic mesh are molded to a sloping plastic mesh back, and the remainder of said left side plastic mesh and said right plastic mesh are disposed and molded to a top buoyancy chamber assembly, an upper end of said sloping mesh back is molded to a top buoyancy chamber sloping back, said buoyancy chamber assembly is molded of brightly colored plastic, and a keel, having a cutout for a hand hold and a hole for a tow line is attached perpendicular on the exterior surface of said cylindrical wall starting at said container bottom and continuing vertically to said sloping plastic mesh back where said keel angles up and sloping plastic mesh back and continues up a top buoyancy chamber sloping back and terminates at a top buoyancy chamber top, and inside said cylindrical wall opposite said keel, a main buoyancy chamber assembly is molded in a quadrant of said cylindrical wall, the location of said main buoyancy chamber assembly is designated as a front of said container, the opposite side of said container where said keel is attached is designated a rear of said container, and said container having an access opening, and an access cover assembly disposed on the front of said container between said main buoyancy chamber assembly and said top buoyancy chamber assembly.

9. The container of claim 8, wherein said main buoyancy chamber assembly comprises a bulkhead of transparent plastic having an upper end, a right edge, a left edge, and a bottom end molded with and disposed contiguous to said container bottom forming a chord within the front arc of said cylindrical wall, having the right and left edges molded vertically to said cylindrical wall extending from said container bottom to the same height as said upper end of said cylindrical wall where said bulkhead terminates and is molded to a main buoyancy chamber top of transparent plastic, said main buoyancy chamber top joins to said front of said upper end of said cylindrical wall thus forming a watertight buoyancy chamber in said front of said cylindrical body assembly, providing a means for assuring said container floating with said access opening up, and said main buoyancy chamber assembly is transparent providing a means for viewing bait when said container is floating horizontally or is sitting vertically.

10. The container of claim 8, wherein said top buoyancy chamber assembly comprises generally a top buoyancy chamber side, in the form of an arc of a cylinder of brightly colored plastic molded to a top buoyancy chamber bottom of brightly colored plastic formed in the shape of a segment of a circle having the same radius as said cylindrical wall, and said top buoyancy chamber side having an upper end molded to said top buoyancy chamber top of brightly colored plastic formed in the shape of a segment of a circle with the same radius as said cylindrical wall and said top buoyancy chamber sloping back of brightly colored plastic, sloping from said top buoyancy chamber bottom up and toward said front of said container and molded to said top buoyancy chamber top which is molded to said top buoyancy chamber bottom, to said top buoyancy chamber top and to said top buoyancy chamber side, forming said top buoyancy chamber assembly that is watertight and brightly colored to improve visibility, and said top buoyancy chamber assembly serves as means for maintaining said access opening above water and for preventing said container from submerging while being towed, said top buoyancy chamber assembly is molded to said upper ends of said left side plastic mesh, said right side plastic mesh, and to said sloping plastic mesh back, with said top buoyancy chamber bottom forming the top of said access opening.

11. The container of claim 10, wherein said access opening comprises an opening in said front of said cylindrical body assembly disposed below said top buoyancy chamber bottom, and above said main buoyancy chamber top that forms the bottom of said access opening, a left body stiffener and a right body stiffener of solid plastic molded to an end of said right side plastic mesh and an end of said left side plastic mesh disposed vertically between said main buoyancy chamber top and said top buoyancy chamber bottom forms two sides of said access opening which is covered by said access cover assembly.

12. The container of claim 11, wherein said access cover assembly comprises an access cover having a plurality of elastic strips whose sides are contiguous one to the other presenting a continuous face, and said elastic strips having a right end sandwiched between a right cover hook and a right cover bar, and having a left end of said elastic strips sandwiched between a left cover hook and a left cover bar, a number of fasteners may be used to connect the cover hooks to the cover bars, said right cover hook engages a right hook bracket attached to said right body stiffener, and when said elastic strips are stretched to allow said left cover hook to engage a left hook bracket attached to said left body stiffener, said access cover effectively closes said access opening and provides a means for retrieval of bait by reaching between said elastic strips, which will stretch enough to allow entry of a hand and a wrist of an angler, into said container but said elastic strips will remain tight enough to prevent bait from escaping.

13. The container of claim 12, wherein said access cover assembly comprises a means of securing the ends of said access cover assembly to said container with a retainer pin inserted in a left hook bracket retainer hole or into a right hook bracket retainer hole providing a means for preventing loss of said access cover assembly, unhooking one end of said access cover assembly and folding said access cover over the end of said access cover assembly where said retainer pin is inserted provides a means for placing bait in said container without any obstructions, removing said retainer pin and unhooking both of the ends of said access cover assembly provides a means for removing said access over assembly from said container for cleaning or replacement.

14. The container of claim 8, wherein said keel comprises a relative large flat plastic member having said cutout for a hand hold disposed in said keel, providing means for carrying said container and said keel having said hole for said tow line disposed to raise said top buoyancy chamber assembly providing a means for reducing drag while improving towing characteristics of said container while being towed, said keel is relatively large to provide a means for keeping said container running straight without rotating when being towed.

\* \* \* \* \*